United States Patent
Nakabayashi

[11] Patent Number: 5,901,137
[45] Date of Patent: May 4, 1999

[54] CONTROL SIGNAL TRANSFERRING SYSTEM

[75] Inventor: Yoko Nakabayashi, Tokyo, Japan

[73] Assignee: NEC Corporation, Tokyo, Japan

[21] Appl. No.: 08/644,168

[22] Filed: May 10, 1996

[30] Foreign Application Priority Data

May 10, 1995 [JP] Japan ................................ 7-111002

[51] Int. Cl.$^6$ ................................................ H04L 12/437
[52] U.S. Cl. ......................... 370/222; 370/225; 370/522; 371/20.6; 395/182.02
[58] Field of Search ................................. 370/222, 223, 370/224, 225, 228, 522; 430/825.01, 825.05; 371/20.6; 395/182.02

[56] References Cited

U.S. PATENT DOCUMENTS

| | | | |
|---|---|---|---|
| 5,341,364 | 8/1994 | Marra et al. | 370/223 |
| 5,532,862 | 7/1996 | Tada et al. | 359/161 |
| 5,537,393 | 7/1996 | Shioda et al. | 370/223 |
| 5,636,205 | 6/1997 | Suzuki et al. | 370/224 |

FOREIGN PATENT DOCUMENTS 7-95225  4/1995  Japan .

OTHER PUBLICATIONS

Search Report, Oct. 1, 1998.

Sonet Bidirectional Line–Switched Ring Equipment Generic Criteria, Generic Requirements, GR–123–CORE, Issue 1, Dec. 1993.

*Primary Examiner*—Hassan Kizou
*Attorney, Agent, or Firm*—Sughrue, Mion, Zinn, Macpeak & Seas, PLLC

[57] ABSTRACT

A network system includes a plurality of nodes each connecting a first adjacent node and a second adjacent node. In each node, a control signal is received by the receiver from the first adjacent node. A control signal analysis processor analyzes the control signal to perform a activity according to the control signal, and at the same time, an intermediate node determination processor stores the control signal so as to pass the control signal through the node when the control signal is destined for another node. A selector selects a single output signal from the control signal and an output signal of the control signal analysis processor such that the control signal is selected when the control signal is destined for another node. The selected signal is transmitted by a transmitter toward the second adjacent.

21 Claims, 5 Drawing Sheets

APS BYTES IN IDLE STATE

| K1 BYTE | | K2 BYTE | |
|---|---|---|---|
| 0000 | DESTINATION ID | SOURCE ID | 0000 |

APS BYTES IN SWITCHING STATE

| K1 BYTE | | K2 BYTE | | |
|---|---|---|---|---|
| REQUEST CODE | DESTINATION ID | SOURCE ID | S/L | STATUS CODE |

CONTROL SIGNAL TRANSFERRING SYSTEM

BACKGROUND OF THE INVENTION

1. Field of the Invention

The present invention relates to a network system including a plurality of nodes which are connected through physical or logical connections, and in particular to the arrangement of each node in the network system wherein a control signal is transferred from a sender node to a receiver node through at least one intermediate node.

2. Description of the Related Art

In a digital ring system where a plurality of nodes are connected through transmission cables in a ring configuration, several methods have been proposed for protecting network services against failure. One of the protection methods, a self-healing technique is known which provides traffic protection by switching a working line to a protection line when failures that affect the working line occur. Recently attention has been given to the self-healing technique of the Bidirectional Line-Switched Ring (BLSR) system, wherein the Automatic Protection Switching bytes (hereinafter referred to as APS bytes) are used to implement the BLSR self-healing method. Such a method is disclosed in "SONET (Synchronous Optical Network) Bidirectional Line-Switched Ring Equipment Generic Criteria" (GR-1230-CORE Issue 1, December 1993).

More specifically, consider a 4-fiber BLSR system as shown in FIG. 1, wherein nodes N1–N4 are connected in a ring configuration through working lines $BL_1$–$BL_4$ and protection lines $BL_{11}$–$BL_{14}$. When detecting failures that affect the working line $BL_4$ and the protection line $BL_{14}$, the node N1 generates a switch request using the APS bytes and transmits it to the destination node N4 which is connected to the node N1 through the working line $BL_4$ and the protection line $BL_{14}$. The APS bytes for the switch request are transferred to the node N4 through the working lines $BL_1$–$BL_3$ while passing through the nodes N2 and N3 which are not its final destination. When the APS bytes reach final destination node N4, the node N4 performs the appropriate switch action according to the APS bytes received from the source node N1 and a confirmation is sent back to the source node N1. In this manner, the BLSR protection switching is completed after the source node N1 receives the confirmation from the destination node N4.

Referring to FIGS. 2A and 2B, in the SONET overhead, the APS bytes consist of a K1 byte and a K2 byte which are used to coordinate switching activity. The last four bits of the K1 byte are used for the node ID of the destination and the first four bits of the K2 byte are used for the node ID of the source. The first four bits of the K1 byte and the last four bits of the K2 byte are used for control data. The more detailed description is provided in the above document (6-13 to 6-17, GR-1230-CORE Issue 1, December 1993).

As shown in FIG. 3, each node is comprised of a receiver 11, a processing unit including an APS-byte analysis processor 12, and a transmitter 13. The APS-byte analysis processor 12 analyzes the APS bytes received from one adjacent node and performs an appropriate activity such as the protection switching or enters the pass-through state according to the received APS bytes. More specifically, when the destination ID of the received APS bytes is not identical to the node's own ID, the APS-byte analysis processor 12 transfers the received APS bytes, as is, to the next adjacent node. This pass-through state is referred to as a full pass-through state and the node in this state is referred to as an intermediate node. On the other hand, if the received APS bytes are at its destination node, that is, the destination ID of the received APS bytes is identical to the node's own ID, the APS-byte analysis processor 12 performs the appropriate switching and transmits new APS bytes indicating the acknowledgment of the switch request back to the source node. In FIG. 1, the nodes N2 and N3 are intermediate nodes and the nodes N1 and N4 complete the protection switching when the source node N1 receives the new APS bytes from the destination node N4.

In the above conventional transferring system, however, the APS-byte analysis processor 12 of each node located between the source and destination nodes included performs the APS-byte analysis and processing each time APS bytes are received. In general, the processing time $T_{PRO}$ required for the APS-byte analysis and processing is of the order of several milliseconds, which is obtained by the equation: $T_{PRO}=T_{DBT}+T_{GEN}+T_{OUT}$, where $T_{DET}$ is the time required for detection of the APS bytes, $T_{GEN}$ is the time required for generation of new APS bytes, and $T_{OOT}$ is the time required for output processing of the new APS bytes.

Therefore, rapid protection switching cannot be achieved without providing each node with the very high-speed processing unit. In general, the elapsed time from failure detection to protection switching completion can be obtained as the sum of the time required for switching at both source and destination nodes and the transmission delay time. Since the transmission delay time is a function of the number of nodes, the larger the number of nodes in the ring system, the longer the elapsed time until protection switching completion. Therefore, according to the conventional system, the high-speed protection switching cannot be achieved in the ring system, especially, one which includes a large number of nodes.

Alternatively, it is considered that the entire APS processor is separately formed with hardware so as to increase in processing speed. However, such a system results in the complicated circuit of the processing unit and an increased amount of hardware.

SUMMARY OF THE INVENTION

It is an object of the present invention to provide a node of a network system which can achieve the high-speed transfer of a control signal without increasing the amount of hardware in the network system.

It is another object of the present invention to provide the pass-through control of each node of the network system which can achieve the high-speed transfer of a control signal through intermediate nodes.

It is still another object of the present invention to provide a control signal transferring method which can achieve the high-speed protection against failures in the ring system.

According to an aspect of the present invention, in a network system comprising a plurality of nodes each connecting a first adjacent node and a second adjacent node, each node has a pass-through controller which passes the control signal through the node when the control signal is not destined for the node. The node, receiving the control signal from the first adjacent node, determines whether the destination node of the control signal is the node. When the destination node of the control signal is not the node, the node transmits the control signal toward the second adjacent node without analyzing the control signal, that is, passes it therethrough.

The control signal is analyzed by an analysis means which performs an activity according to the control signal. The pass-through controller is comprised of a selector for selecting a single output signal from the control signal and an output signal of the analysis means such that the control signal is selected when the destination node of the control signal is not the node. The single output signal is transmitted toward the second adjacent node.

A network system according to the present invention is comprised of a plurality of nodes each connecting a first adjacent node and a second adjacent node. Each node is comprised of a receiving means for receiving a control signal from the first adjacent node, the control signal being destined for a destination node in the network system; a first means for analyzing the control signal to perform an activity according to the control signal; a second means provided separately from the first means, for storing the control signal so as to pass the control signal through the node when a predetermined condition is satisfied; a selecting means for selecting a single output signal from a first output signal of the first means and a second output signal of the second means such that the second output signal of the second means is selected when the predetermined condition is satisfied; and a transmitting means for transmitting the single output signal toward the second adjacent.

Preferably, the second means is comprised of a first storage means for storing the control signal; a first determining means for determining whether the destination node of the control signal is the node; a second storage means for storing a previous control signal which has been received by the receiving means; and a second determining means for determining whether the control signal is identical to the previous control signal. The selecting means selects the second output signal of the second means when the first determining means determines that the destination node of the control signal is not the node and the second determining means determines that the control signal is not identical to the previous control signal. The first means and the second means are concurrently initiated when the control signal is received by the receiving means.

Since the control signal is passed through the node which is not its final destination node, the pass-through time of the intermediate node determination means is almost negligible compared with the processing time in the control signal analysis means which performs an activity according the control signal. Therefore, by using the intermediate node determination means in parallel with the control signal analysis means, a dramatically reduced time required for control signal pass-through can be achieved with simple structure and the reduced amount of hardware. Since the protection control signal rapidly passes through each of the intermediate nodes, a high-speed self-healing is achieved in a ring network system such as the BLSR system.

DETAILED DESCRIPTION OF THE PREFERRED EMBODIMENTS

Figure 1:
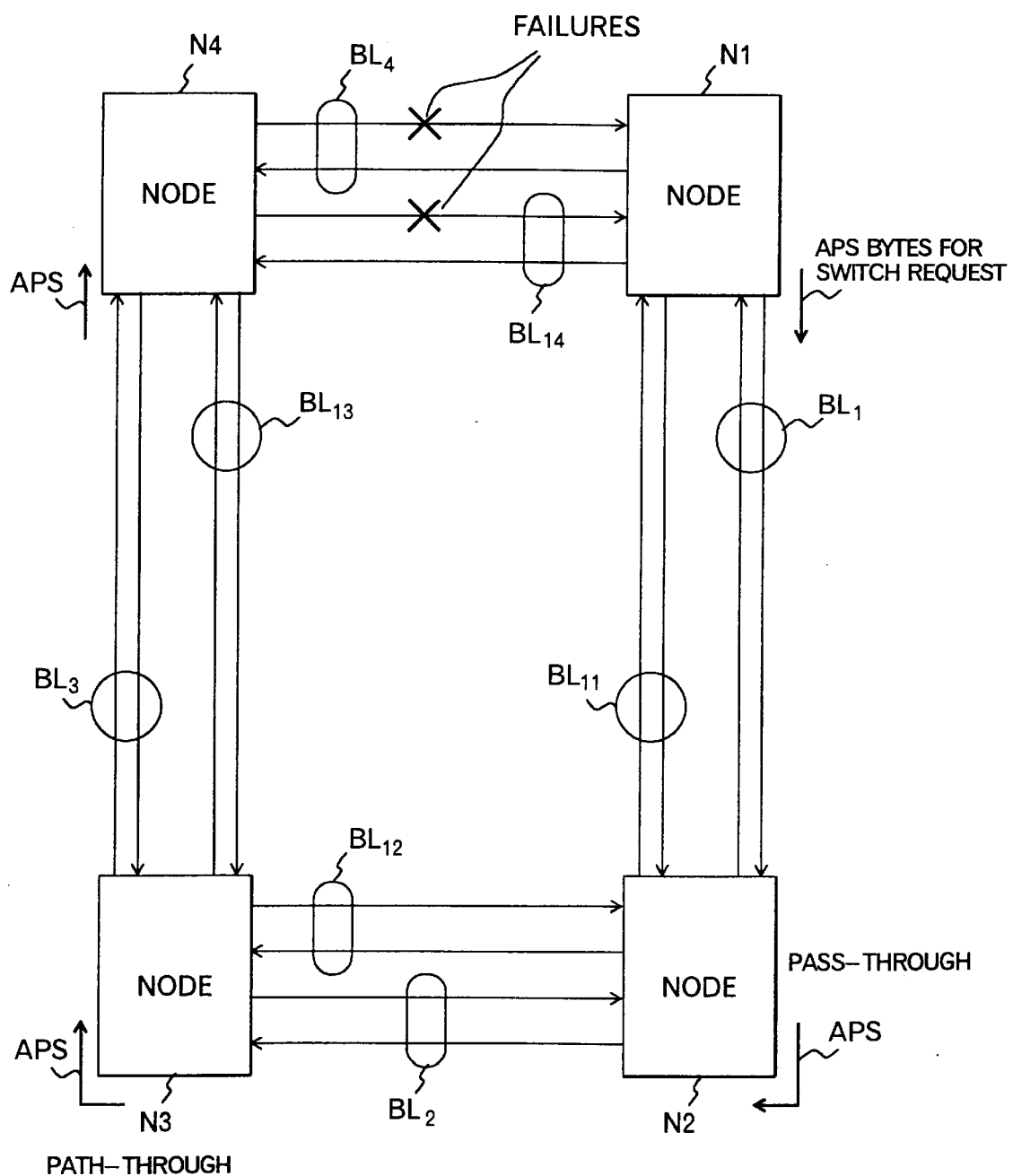
FIG. 1 is a block diagram showing a 4-fiber BLSR system in order to give an explanation for the transfer of APS bytes.
Figure 4:
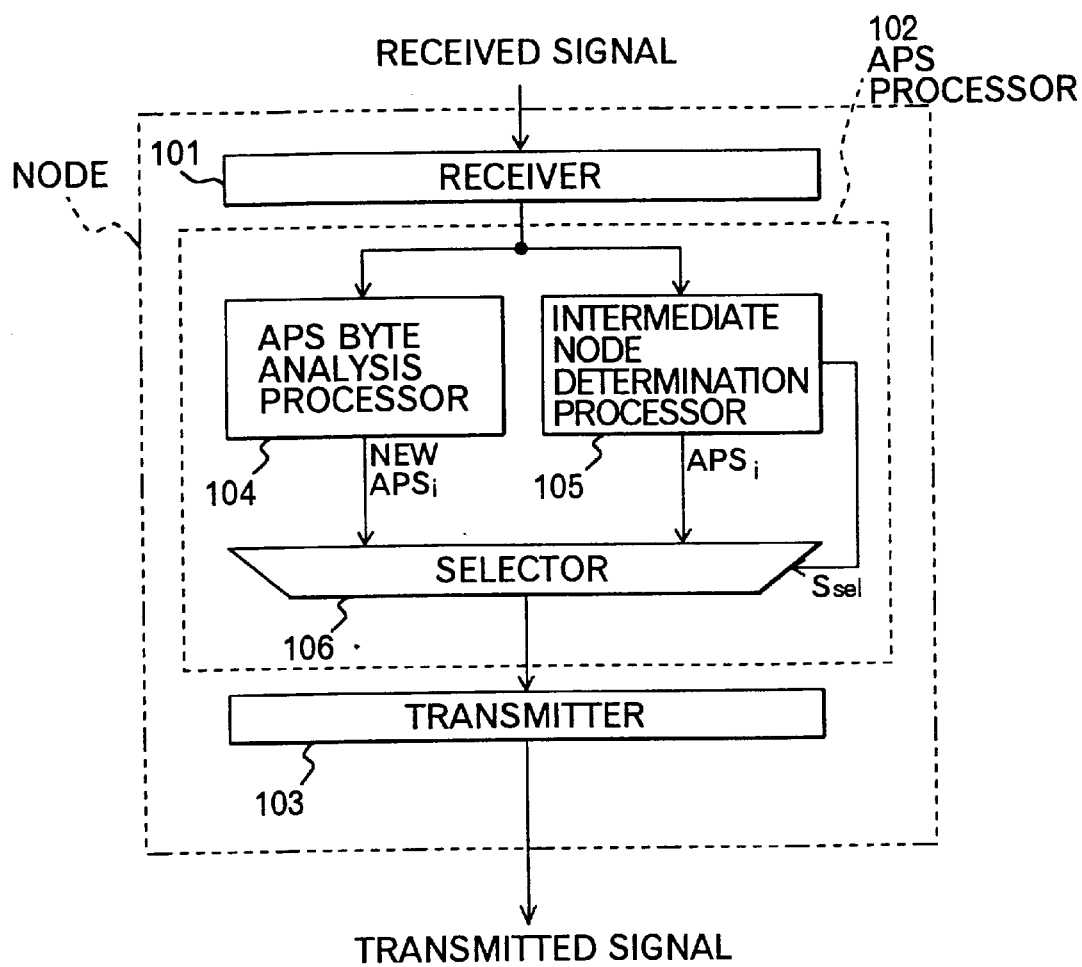
FIG. 4 is a block diagram showing the circuit of an APS processor according to an embodiment of the present invention.

Referring to FIG. 4, each node in the BLSR system as shown in FIG. 1 is comprised of a receiver 101, a processing unit including an APS processor 102 which is implemented by means of program control, and a transmitter 103. The APS processor 102 implements an APS-byte analysis processor 104, an intermediate node determination processor 105, and a selector 106 which selects APS bytes from the outputs of the APS-byte analysis processor 104 and the intermediate node determination processor 105. The receiver 101 receives a signal from one adjacent node and outputs a current APS bytes $APS_i$ to both the APS-byte analysis processor 104 and the intermediate node determination processor 105.

Figures 2A, 2B, 3:
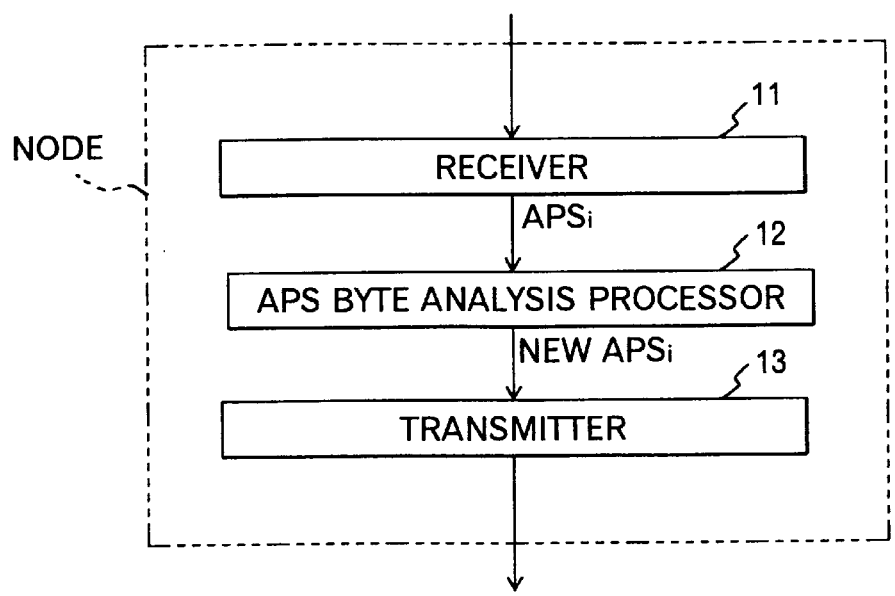
FIG. 2A is a schematic diagram showing an APS bytes in an idle state.
FIG. 2B is a schematic diagram showing an APS bytes in a switching state.
FIG. 3 is a schematic block diagram showing the conventional circuit of a node.

The APS-byte analysis processor 104, as described before, analyzes the current APS bytes $APS_i$ and performs appropriate activities such as the protection switching and confirmation replying according to the received control data when the current APS bytes $APS_i$ is destined for its own node. The APS-byte analysis processor 104 may implement the appropriate activities required in the case where the current APS bytes $APS_i$ is destined for its own node. Needless to say, the APS-byte analysis processor 104 may use the same processor as the APS-byte analysis processor 12 as shown in FIG. 3.

The intermediate node determination processor 105 determines whether the current APS bytes $APS_i$ is destined for its own node. When the current APS bytes $APS_i$ is destined for another node, the intermediate node determination processor 105 outputs the current APS bytes $APS_i$ to the selector 106, as is and, at the same time, outputs a selection signal $S_{sel}$ of the logical value 1 to the selector 106 so that the selector 106 selects the output of the intermediate node determination processor 105. On the other hand, when the current APS bytes $APS_i$ is at its final destination node, the intermediate node determination processor 105 outputs a selection signal $S_{sel}$ of the logical value 0 to the selector 106 so that the selector 106 selects the output of the APS-byte analysis processor 104.

Figure 5:
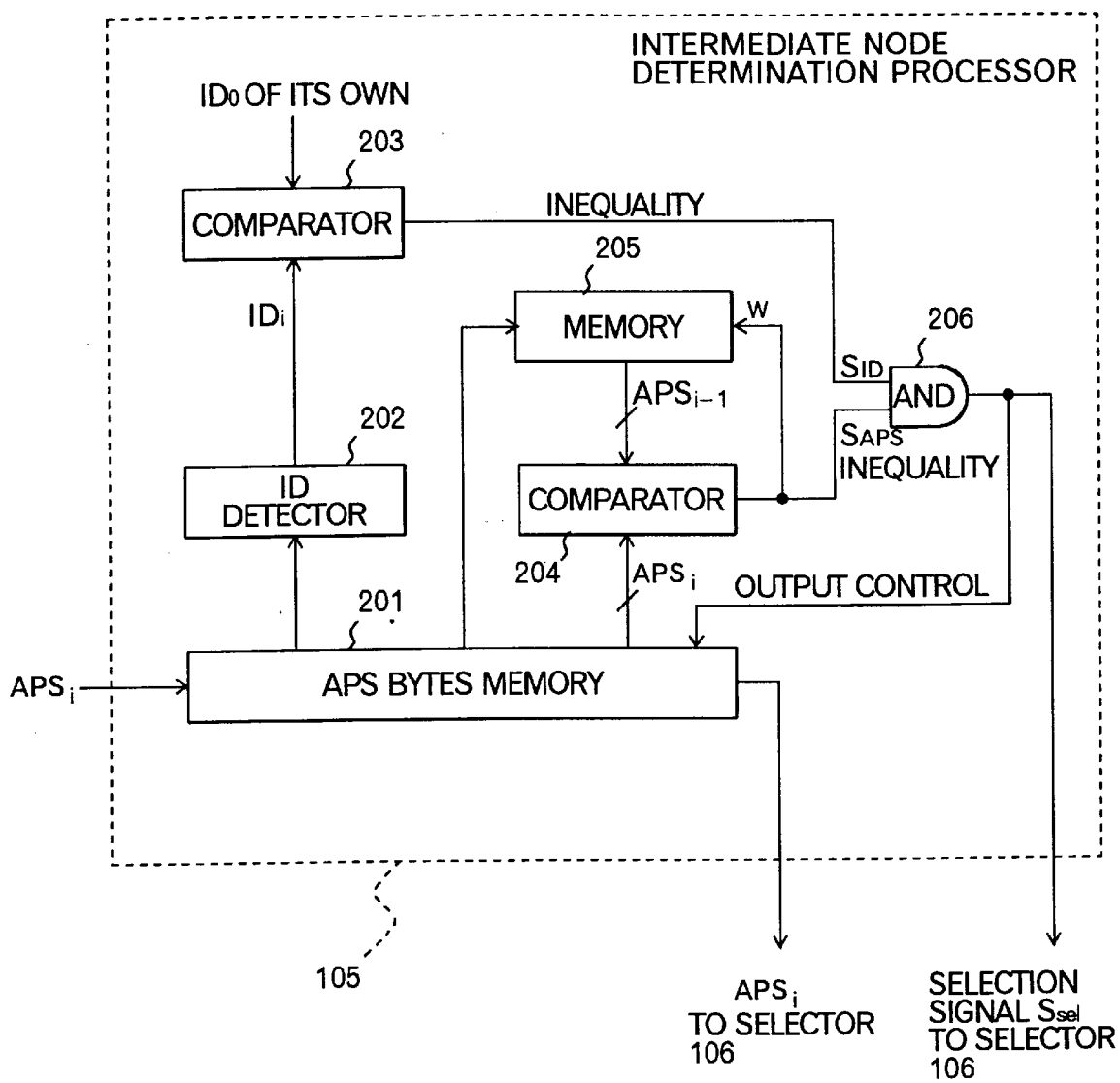
FIG. 5 is a detailed block diagram showing the circuit of an intermediate node determination processor included in the APS processor according to the embodiment.

Referring to FIG. 5, the intermediate node determination processor 105 is provided with an APS bytes memory 201 for storing the received APS bytes $APS_i$. An ID detector 202 reads the destination $ID_i$ of the APS bytes $APS_i$ from the APS bytes memory 201 and outputs it to a comparator (or a coincidence circuit) 203 which compares its own $ID_o$ to the destination $ID_i$ of the APS bytes $APS_i$. When the destination $ID_i$ of the APS bytes $APS_i$ is identical to its own $ID_o$, in other words, the APS bytes $APS_i$ is at its final destination, the comparator 203 generates an inequality signal $S_{ID}$ of the logical value 0. On the other hand, when the destination $ID_i$ of the APS bytes $APS_i$ is not identical to its own $ID_o$, in other words, the APS bytes $APS_i$ is destined for another node, the comparator 203 generates an inequality signal $S_{ID}$ of the logical value 1.

A comparator (or a coincidence circuit) 204 compares the current APS bytes $APS_i$ read from the APS bytes memory 204 and the previous APS bytes $APS_{i-1}$ read from a memory 205. When the current APS bytes $APS_i$ is not identical to the previous APS bytes $APS_{i-1}$, the comparator 204 produces an inequality signal $S_{APS}$ of the logical value 1. The memory 205, receiving the inequality signal $S_{APS}$ of the logical value 1, stores the current APS bytes $APS_i$ read from the APS bytes memory 201. If the inequality signal $S_{APS}$ is of the logical value 0, the memory 205 continues storing the previous APS bytes $APS_{i-1}$. In other words, the memory 205 is updated when the current APS bytes are different from the previous APS bytes.

The inequality signal $S_{ID}$ and the inequality signal $S_{APS}$ are provided to an AND gate 206 which outputs the result as a selection signal $S_{sel}$ to the selector 106 and as an output control signal to the APS bytes memory 201. In this embodiment, the selection signal $S_{sel}$ of the logical value 1 is produced when both the inequality signal $S_{ID}$ and the inequality signal $S_{APS}$ are of the logical value 1, causing the current APS bytes $APS_i$ to be transferred from the APS bytes memory 201 to the selector 106 which selects the current APS bytes $APS_i$. In other words, the APS processor 102 enters the full pass-through state when the APS bytes $APS_i$ is destined for another node and is not identical to the previous one.

Since the APS bytes are written onto the APS bytes memory 201 and then read from the same when in the full pass-through state, the pass-through time $T_{THR}$ elapsed from receiving to transmitting the APS bytes is of the order of several tens of nanoseconds. Compared with the processing time $T_{PRO}$ of the APS-byte analysis processor 104, the intermediate node determination processor 105 achieves the dramatically reduced time required for APS pass-through.

It should be noted that the APS bytes memory 201 may be shared between the APS-byte analysis processor 104 and the intermediate node determination processor 105. Further, since the intermediate node determination processor 105 can be arranged with a small number of circuit elements, it may be formed with hardware.

The control including APS pass-through and APS analysis and processing is performed by the APS processor 102, which will be described hereinafter.

Figure 6:
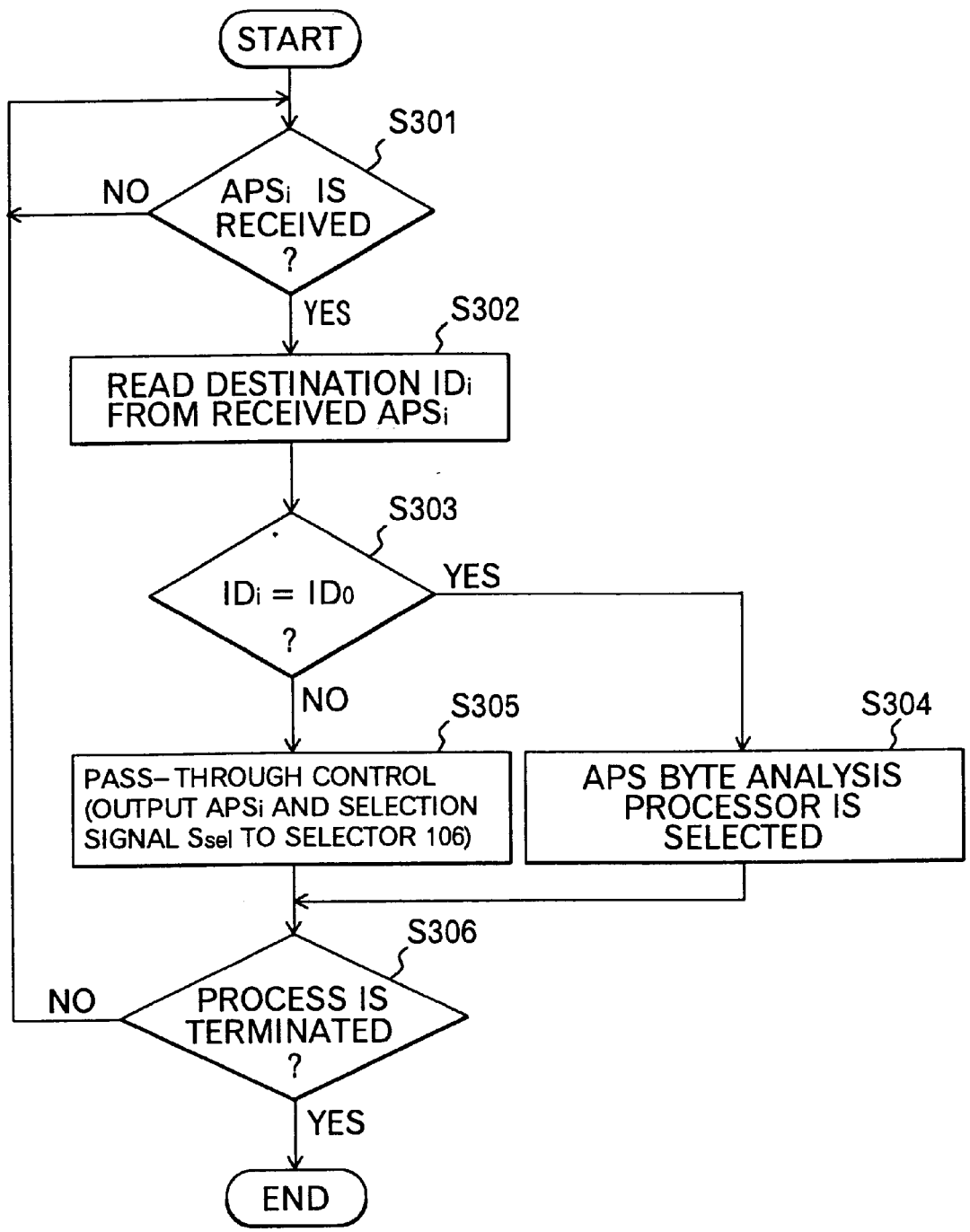
FIG. 6 is a flow chart showing an operation of the APS processor.

Referring to FIG. 6, when receiving the APS bytes $APS_i$ from the receiver 101 (YES in step S301), the APS processor 102 initiates concurrently both the APS-byte analysis processor 104 and the intermediate node determination processor 105 after storing the APS bytes $APS_i$ into the APS bytes memory 201. The intermediate node determination processor 105 reads the destination $ID_i$ of the APS bytes $APS_i$ from the APS bytes memory 201 (step S302), and then determines whether its own $ID_o$ is identical to the destination $ID_i$ of the APS bytes $APS_i$ (step S303).

If the destination $ID_i$ of the APS bytes $APS_i$ is identical to its own $ID_o$, the APS processor 102 stops the intermediate node determination processor 105 with the selector 106 selecting the APS-byte analysis processor 104 (step S304). Therefore, confirmation APS bytes produced by the APS-byte analysis processor 104 are selected and transferred to the transmitter 103 by the selector 106.

On the other hand, when the destination $ID_i$ of the APS bytes $APS_i$ is not identical to its own $ID_o$ (NO in step S303), the APS processor 102 performs the pass-through control (step S305). More specifically, as described before, the intermediate node determination processor 105 outputs the selection signal $S_{sel}$ of the logical value 1 to the selector 106 so that the selector 106 selects the output of the intermediate node determination processor 105. Therefore, the current APS bytes $APS_i$ read from the APS bytes memory 201 are transferred to the transmitter 103 through the selector 106.

In this manner, the APS processor 102 repeats the steps S301–S305 until the process is terminated (step S306). As described above, the pass-through time $T_{THR}$ elapsed from receiving to transmitting the APS bytes is of the order of several tens of nanoseconds. Compared with the processing time $T_{PRO}=T_{DET}+T_{GEN}+T_{OUT}$ of the order of several milliseconds in the APS-byte analysis processor 104, the pass-through time $T_{THR}$ of the intermediate node determination processor 105 is almost negligible. Therefore, by using the intermediate node determination processor 105 in parallel with the APS-byte analysis processor 104, the dramatically reduced time required for APS pass-through can be achieved with simple structure and a reduced amount of hardware. Since the APS bytes rapidly passes through each of the intermediate nodes, a high-speed self-healing is achieved in the BLSR system as shown in FIG. 1.

What is claimed is:

1. A network system comprising a plurality of nodes each connecting a first adjacent node and a second adjacent node, each one of the nodes comprising:

a receiving means for receiving a control signal from the first adjacent node, the control signal being destined for a destination node in the network system;

a determining means for determining whether the destination node of the control signal is the node;

a pass-through control means for transmitting the control signal toward the second adjacent node without analyzing the control signal when the destination node of the control signal is not the node; and an analysis means for analyzing the control signal received by the receiving means to perform an activity according to the control signal, the analysis means being initiated concurrently with the determining means, wherein said activity includes the generation of a new address for said control signal.

2. The network system according to claim 1, wherein the pass-through control means comprises:

a selecting means for selecting a single output signal from the control signal and an output signal of the analysis means such that the control signal is selected when the destination node of the control signal is not the node; and a transmitting means for transmitting the single output signal toward the second adjacent node.

3. A node of the network system according to claim 1.

4. A network system comprising a plurality of nodes each connecting a first adjacent node and a second adjacent node, each one of the nodes comprising:

a receiving means for receiving a control signal from the first adjacent node, the control signal being destined for a destination node in the network system;

a first means for analyzing the control signal to perform an activity according to the control signal, wherein said activity includes the generation of a new address for said control signal;

a second means provided physically separate from, but operating concurrently with, the first means, for storing the control signal so as to pass the control signal through the node when a predetermined condition is satisfied;

a selecting means for selecting a single output signal from a first output signal of the first means and a second output signal of the second means such that the second output signal of the second means is selected when the predetermined condition is satisfied; and a transmitting means for transmitting the single output signal toward the second adjacent node.

5. The network system according to claim 4, wherein the second means comprises:

a first storage means for storing the control signal; and a first determining means for determining whether the destination node of the control signal is the node.

6. The network system according to claim 5, wherein the second means further comprises:

a second storage means for storing a previous control signal which has been received by the receiving means; and a second determining means for determining whether the control signal is identical to the previous control signal.

7. The network system according to claim 6, wherein the selecting means selects the second output signal of the second means when the first determining means determines that the destination node of the control signal is not the node and the second determining means determines that the control signal is not identical to the previous control signal.

8. The network system according to claim 5, wherein the selecting means selects the second output signal of the second means when the first determining means determines that the destination node of the control signal is not the node.

9. A node of the network system according to claim 4.

10. A network system comprising a plurality of nodes each connecting a first adjacent node and a second adjacent node, each one of the nodes comprising:

a receiving means for receiving a control signal from the first adjacent node, the control signal being destined for a destination node in the network system;

a first means for analyzing the control signal to perform an activity according to the control signal, wherein said activity includes the generation of a new address for said control signal;

a second means operating concurrently with said first means for storing the control signal;

a control means for controlling the first means and the second means such that a first output signal of the first means is selected when the destination node of the control signal is the node and a second output signal of second means is selected when the destination node of the control signal is not the node; and a transmitting means for transmitting a selected output signal of the first and second output signals toward the second adjacent.

11. The network system according to claim 10, wherein the second means comprises:

a first storage means for storing the control signal; and a first determining means for determining whether the destination node of the control signal is the node.

12. The network system according to claim 11, wherein the second means further comprises:

a second storage means for storing a previous control signal which has been received by the receiving means; and a second determining means for determining whether the control signal is identical to the previous control signal.

13. The network system according to claim 12, wherein the control means selects the second output signal of the second means when the first determining means determines that the destination node of the control signal is not the node and the second determining means determines that the control signal is not identical to the previous control signal.

14. The network system according to claim 11, wherein the control means selects the second output signal of the second means when the first determining means determines that the destination node of the control signal is not the node.

15. A node of the network system according to claim 10.

16. A network system comprising a plurality of nodes in a ring configuration, each node connecting a first adjacent node and a second adjacent node, and the nodes being connected through a working line and a protection line, each one of the nodes comprising:

a receiving means for receiving a protection control signal from the first adjacent node, the protection control signal being destined for a destination node and being used for protection against failures in the network system;

a first means for analyzing the protection control signal to perform a protection activity according to the protection control signal, wherein said activity includes the generation of a new address for said control signal;

a second means provided physically separate from, but operating concurrently with, the first means, for storing the protection control signal so as to pass the protection control signal through the node when a predetermined condition is satisfied;

a selecting means for selecting a single output signal from a first output signal of the first means and a second output signal of the second means such that the second output signal of the second means is selected when the predetermined condition is satisfied; and a transmitting means for transmitting the single output signal toward the second adjacent.

17. A node of the network system according to claim 16.

18. A method for transferring a control signal in a network system comprising a plurality of nodes, each connecting a first adjacent node and a second adjacent node, the method comprising the steps of:

at each one of the nodes, receiving a control signal from the first adjacent node, the control signal being destined for a destination node in the network system;

determining whether the destination node of the control signal is the node;

analyzing, concurrently with said determining step, the control signal to perform an activity according to the control signal, the activity producing a replying control signal and generating a new address for said control signal; and transmitting the control signal toward the second adjacent without analyzing the control signal when the destination node of the control signal is not the node.

19. The method according to claim 18, wherein the transmitting step comprises the steps of:

selecting a single output signal from the control signal and the replying control signal such that the replying control signal is selected when the destination node of the control signal is not the node; and transmitting the single output signal toward the second adjacent node.

20. A method for transferring a control signal in a network system comprising a plurality of nodes, each node connecting a first adjacent node and a second adjacent node, the method comprising the steps of:

at each one of the nodes, receiving a control signal from the first adjacent node, the control signal being destined for a destination node in the network system;

analyzing the control signal to perform an activity according to the control signal, the activity producing a replying control signal and generating a new address for said control signal;

storing, concurrently with said analyzing step, the control signal so as to pass the control signal through the node when a predetermined condition is satisfied;

selecting a single output signal from the replying control signal and the control signal such that the control signal is selected when the predetermined condition is satisfied; and transmitting the single output signal toward the second adjacent.

21. A method for transferring a control signal in a network system comprising a plurality of nodes in a ring configuration, each node connecting a first adjacent node and a second adjacent node, and the nodes being connected through a working line and a protection line, the method comprising the steps of:

at each one of the nodes, receiving a protection control signal from the first adjacent node, the protection control signal being destined for a destination node and being used for protection against failures in the network system;

analyzing the protection control signal to perform a protection activity according to the protection control signal, the protection activity producing a replying control signal and generating a new address for said control signal;

storing, concurrently with said analyzing step, the protection control signal so as to pass the protection control signal through the node when a predetermined condition is satisfied;

selecting a single output signal from the replying control signal and the control signal such that the control signal is selected when the predetermined condition is satisfied; and transmitting means for transmitting the single output signal toward the second adjacent.

* * * * *

UNITED STATES PATENT AND TRADEMARK OFFICE
CERTIFICATE OF CORRECTION

PATENT NO. : 5,901,137
DATED : May 4, 1999
INVENTOR(S) : Yoko NAKABAYASHI

It is certified that error appears in the above-identified patent and that said Letters Patent is hereby corrected as shown below:

Column 2,　　line 20,　　delete "$T_{OOT}$" and insert --$T_{OUT}$--.

Signed and Sealed this

Twenty-first Day of December, 1999

Attest:

Q. TODD DICKINSON

*Attesting Officer*　　*Acting Commissioner of Patents and Trademarks*